(12) United States Patent
Caruel et al.

(10) Patent No.: US 10,239,227 B2
(45) Date of Patent: Mar. 26, 2019

(54) METHOD OF MANUFACTURING A COMPOSITE SANDWICH PANEL FOR AN AIRCRAFT PROPULSION UNIT

(71) Applicant: Safran Nacelles, Gonfreville l'Orcher (FR)

(72) Inventors: Pierre Caruel, Gonfreville l'Orcher (FR); Hervé Hurlin, Gonfreville l'Orcher (FR)

(73) Assignee: SAFRAN NACELLES, Gontreville l'orcher (FR)

( * ) Notice: Subject to any disclaimer, the term of this patent is extended or adjusted under 35 U.S.C. 154(b) by 0 days.

(21) Appl. No.: 16/008,208

(22) Filed: Jun. 14, 2018

(65) Prior Publication Data

US 2018/0290330 A1    Oct. 11, 2018

Related U.S. Application Data

(63) Continuation of application No. PCT/FR2016/053303, filed on Dec. 9, 2016.

(30) Foreign Application Priority Data

Dec. 14, 2015 (FR) ...................................... 15 62300

(51) Int. Cl.
*B32B 3/12* (2006.01)
*B64C 7/02* (2006.01)
(Continued)

(52) U.S. Cl.
CPC ................ *B28B 1/002* (2013.01); *B28B 1/30* (2013.01); *B28B 1/522* (2013.01); *B28B 11/005* (2013.01);
(Continued)

(58) Field of Classification Search
CPC ... B32B 3/12; B32B 37/146; B32B 2305/024; B32B 2605/18; B32B 18/00;
(Continued)

(56) References Cited

U.S. PATENT DOCUMENTS 5,131,970 A  *  7/1992  Potter .................... B29C 33/046
                                                         156/205
5,139,596 A  *  8/1992  Fell ......................... B29C 65/10
                                                         156/197
(Continued)

FOREIGN PATENT DOCUMENTS

WO         2014/118216         8/2014

OTHER PUBLICATIONS

International Search Report for International Application PCT/FR2016/053303, dated Apr. 20, 2017.

*Primary Examiner* — Carson Gross
(74) *Attorney, Agent, or Firm* — Burris Law, PLLC

(57) ABSTRACT

The present disclosure provides a method of manufacturing a composite sandwich panel having a core formed of a plurality of cells extending vertically between a first skin and a second skin. The method includes creating at least one first strip and a second strip from a temporary material, each strip having at least one cavity having a succession of aligned half-cells, lining the cavity of the first strip with a fibrous ply, assembling the first strip and the second strip by interlocking the cavity of the first strip with the cavity of the second strip and trapping the fibrous ply therebetween, and trimming excess temporary material of the entirety of the strips formed during the preceding assembly step so as to form a new cavity which forms a succession of aligned half-cells.

12 Claims, 5 Drawing Sheets

(51) Int. Cl.
   *B32B 37/14*    (2006.01)
   *C04B 35/80*    (2006.01)
   *B28B 1/00*     (2006.01)
   *B28B 11/00*    (2006.01)
   *B32B 18/00*    (2006.01)
   *C04B 38/00*    (2006.01)
   *C04B 35/628*   (2006.01)
   *F02K 1/82*     (2006.01)
   *B28B 1/30*     (2006.01)
   *B28B 1/52*     (2006.01)
   *C04B 111/00*   (2006.01)
   *B64D 29/00*    (2006.01)

(52) U.S. Cl.
   CPC ............. *B32B 3/12* (2013.01); *B32B 18/00* (2013.01); *C04B 35/62849* (2013.01); *C04B 35/62852* (2013.01); *C04B 35/803* (2013.01); *C04B 38/0006* (2013.01); *C04B 38/0083* (2013.01); *F02K 1/82* (2013.01); *F02K 1/822* (2013.01); *F02K 1/827* (2013.01); *B32B 37/146* (2013.01); *B32B 2305/024* (2013.01); *B32B 2315/02* (2013.01); *B32B 2605/18* (2013.01); *B64C 7/02* (2013.01); *B64D 29/00* (2013.01); *C04B 2111/00612* (2013.01); *C04B 2111/00982* (2013.01); *C04B 2235/616* (2013.01); *C04B 2237/38* (2013.01); *F05D 2300/603* (2013.01); *F05D 2300/6033* (2013.01); *Y02T 50/672* (2013.01); *Y02T 50/675* (2013.01); *Y10T 156/108* (2015.01)

(58) Field of Classification Search
   CPC ......... B32B 2315/02; Y10T 428/24149; Y10T 428/24165; Y10T 156/108; C04B 38/0006; C04B 35/62849; C04B 35/62852; C04B 35/80; C04B 35/803; C04B 2237/38; B64C 7/02; B64D 29/00; F05D 2300/6033
   USPC ........................................................ 156/267
   See application file for complete search history.

(56) References Cited

U.S. PATENT DOCUMENTS 5,514,445 A    5/1996  Delage et al.
5,549,773 A *  8/1996  Henderson ............ B29C 66/438
                                              156/173

\* cited by examiner

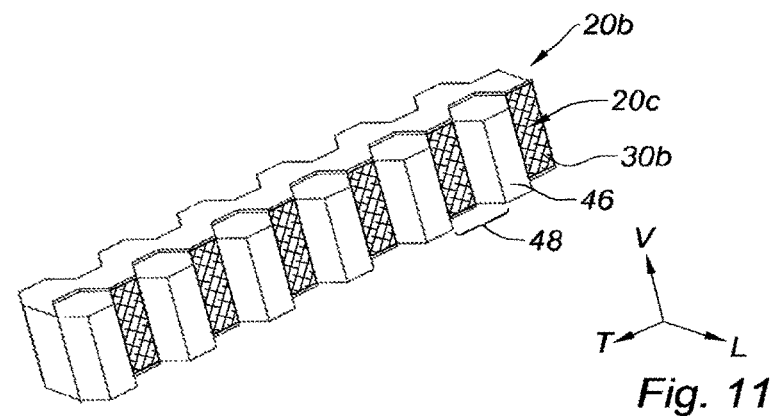
Fig. 11
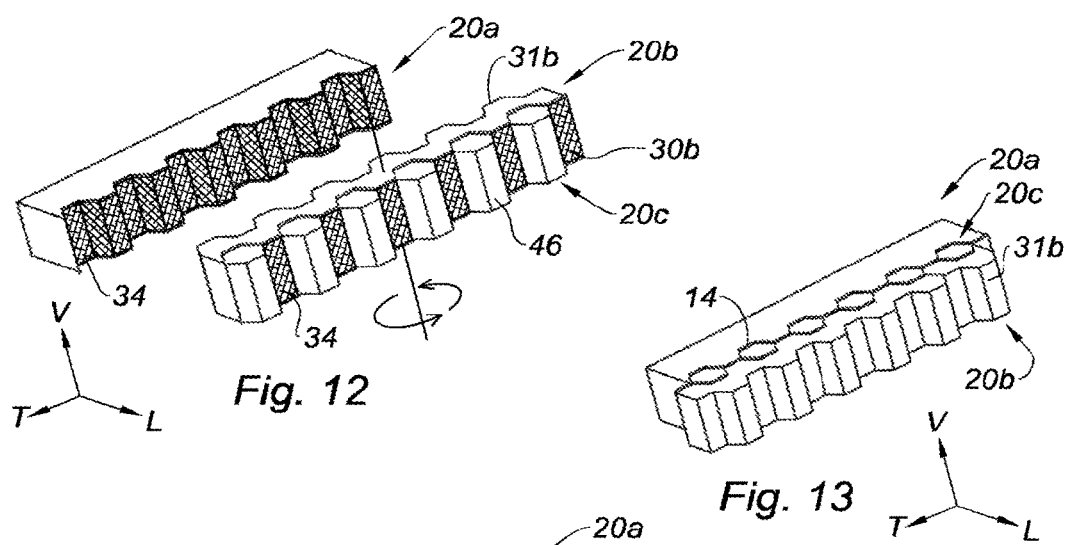
Fig. 12
Fig. 13
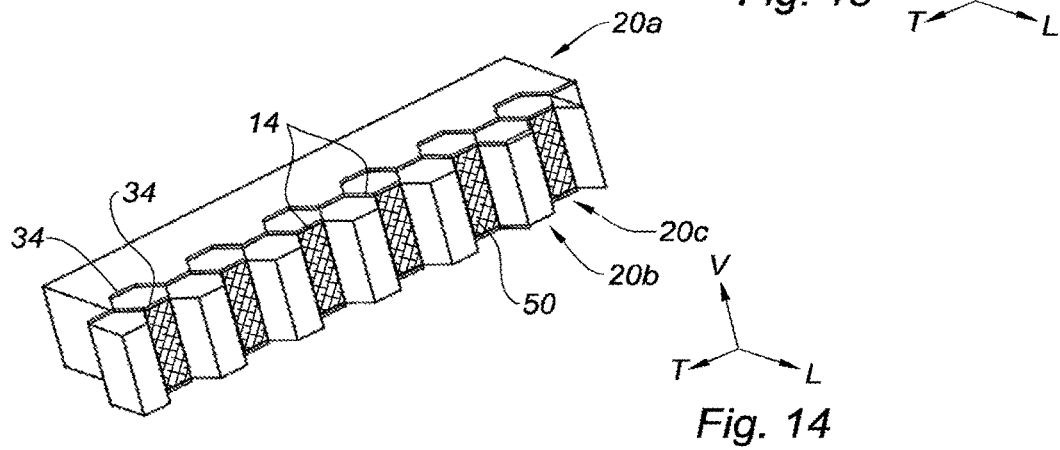
Fig. 14

METHOD OF MANUFACTURING A COMPOSITE SANDWICH PANEL FOR AN AIRCRAFT PROPULSION UNIT

CROSS-REFERENCE TO RELATED APPLICATIONS

This application is a continuation of International Application No. PCT/FR2016/053303, filed on Dec. 9, 2016, which claims priority to and the benefit of FR 15/62300 filed on Dec. 14, 2015. The disclosures of the above applications are incorporated herein by reference.

FIELD

The present disclosure relates to a method for manufacturing a composite-matrix sandwich-panel, in particular for an aircraft propulsion unit.

BACKGROUND

The statements in this section merely provide background information related to the present disclosure and may not constitute prior art.

As known per se, an aircraft propulsion unit conventionally comprises a turbojet engine housed inside a nacelle.

The nacelle generally has a tubular structure comprising an air intake upstream of the turbojet engine, a median section intended to surround a fan of the turbojet engine and its casing, and a downstream section intended to surround the combustion chamber of the turbojet engine and accommodating, where appropriate, thrust reversal means. It may be terminated by an ejection nozzle whose outlet is located downstream of the turbojet engine.

For the purpose of reducing mass and increasing performances, in particular mechanical performances, the aeronautical industry increasingly uses composite materials to produce structural parts and/or panels.

Such elements are generally made from sets of fibrous plies embedded in a matrix made of organic or ceramic materials. These elements can be monolithic or enclose a core made of another material.

This is the case for example in the acoustic panels used to reduce the noise emissions generated by the turbojet engine, and of which is common to equip several portions of the nacelle and/or of the turbojet engine.

These portions of the nacelle and/or of the turbojet engine may be, for example, an inner surface of the air flow path for a bypass turbojet engine, a nozzle or ejection cone surface, an air intake inner panel, etc.

Such acoustic panels are in the form of a sandwich-type panel comprising at least a cellular core, for example a honeycomb-like structure, covered with a perforated or acoustically porous outer skin (called acoustic skin) and with a solid inner skin (called support or structural skin). This set forms a resonator.

The skins of these panels can be made of composite material comprising a set of fibers (superposition of fibrous plies), embedded in a matrix of organic or ceramic origin.

More particularly, the ceramic-matrix composites, also known as "CMC", are composite materials that are formed by a set of commonly ceramic fibers associated with an equally ceramic matrix.

The ceramic composites have interesting properties, in particular tensile strength, flexural strength and breakage resistance properties, heat resistance properties, and anti-corrosion properties.

Also, the ceramic composites are lightweight materials whose density is close to that of aluminum.

Among the ceramic composites, the oxide-based ceramic composites (aluminas, alumino-silicates in particular) are known, they form good electrical insulators and also have an interesting thermal insulation capacity, a good heat resistance and a good mechanical fatigue strength.

Although the ceramic composites have many advantages, their manufacture is delicate.

SUMMARY

The present disclosure provides a fabricating method that allows producing an oxide-type cellular-core composite-sandwich panel.

For this purpose, the present disclosure provides a method for manufacturing a ceramic-matrix composite-material sandwich-panel, the panel including a core formed of a plurality of cells that extend vertically between a first skin and a second skin, the method being characterized in that it comprises at least:

a step of producing at least a first strip and a second strip in a fugitive material, each strip having at least a cavity which comprises a succession of aligned half-cells;

a lining step which includes lining at least one fibrous ply on the cavity of the first strip;

a step of assembling the first strip and the second strip which includes interlocking the cavity of the first strip with the cavity of the second strip, by trapping said fibrous ply; and a trimming step which includes removing the excess fugitive material of all the strips formed during the previous assembling step, so as to form a new cavity which forms a succession of aligned half-cells, said production, lining, assembling and trimming steps being repeated to form the cellular core of the panel.

The method according to the present disclosure allows producing a ceramic-composite panel including a lightweight honeycomb core.

In addition, the use of strips made of a fugitive material (in particular a fungible material) allows "molding" the cells of the core of the panel with a great freedom of shapes, the cells being able to be in particular of a hexagonal or circular section.

According to another feature, the method includes a closing step which includes draping the first skin and the second skin on a first face and a second face respectively of said cellular core formed during the previous production, lining, assembling and trimming steps.

At the end of the closing step, the first skin and the second skin are sintered on the cellular core to assemble the cellular core and said skins in order to form the composite panel.

This feature allows to mechanically connect the cellular core on the skins, which allows a passage of shear forces between the skins and the core, in the plane of the skins of the panel.

In addition, each fibrous ply is made of ceramic fibers and is impregnated with a slurry containing metal or mineral oxide powder allowing to produce a ceramic matrix during the sintering operation.

Also, the method includes a drying step which is carried out following each lining step and which includes drying the fibrous ply impregnated with resin and lined on the associated strip during the lining step.

According to another feature, during the lining stage, the fibrous ply is lined on the cavity of the associated strip by a toothed wheel which has a shape complementary to the shape of said cavity.

The toothed wheel, meshing with the cavity, allows lining the cavity with the fibrous ply so that the fibrous ply takes the form of the cavity.

The shape of the wheel is complementary to that of the cavity, which allows a wide variety of cell shapes.

According to an exemplary form, the toothed wheel is a heating wheel which is designed to heat and dry the fibrous ply simultaneously.

According to an exemplary form, each cell of the core of the panel has a hexagonal shape.

According to another exemplary form, each cell of the core of the panel has a generally circular shape.

The circular cells allow reducing stresses in the fibrous plies during the draping operation and allow improving the flexibility to accommodate deformations when placing the cellular core on the skins.

According to an exemplary form, each strip made of fugitive material has a curved shape, so that the produced panel has a curved shape.

Also, each fibrous ply that forms the cells of the panel has at least a first protrusion and a second protrusion which are folded on each side of the associated strip and which are adapted to cooperate with the first skin and the second skin respectively.

These protrusions allow a mechanical linkage with the skins to promote the passage of forces between the core and the skins of the panel.

Finally, the panel obtained by the method is adapted to equip a nacelle of an aircraft propulsion unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 11 is a perspective view that illustrates a trimming step according to a second mode of implementation of the present disclosure;

FIG. 12 is a perspective view that illustrates a step of assembling a set formed by a second strip and a third strip on a first strip according to a second mode of implementation of the present disclosure;

FIG. 13 is a perspective view that illustrates a step of assembling a set formed by a second strip and a third strip on a first strip, according to a second mode of implementation of the present disclosure;

FIG. 14 is a perspective view that illustrates a trimming step according to a second mode of implementation of the present disclosure;

Figure 1:
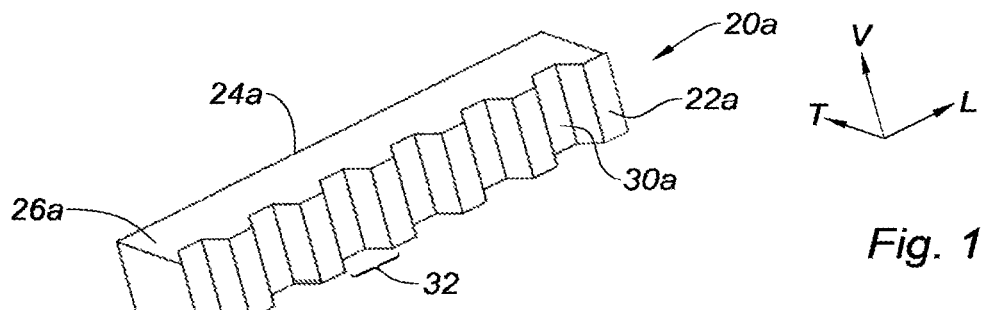
FIG. 1 is a perspective view that illustrates a first strip made of fugitive material having a first cavity.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 8:
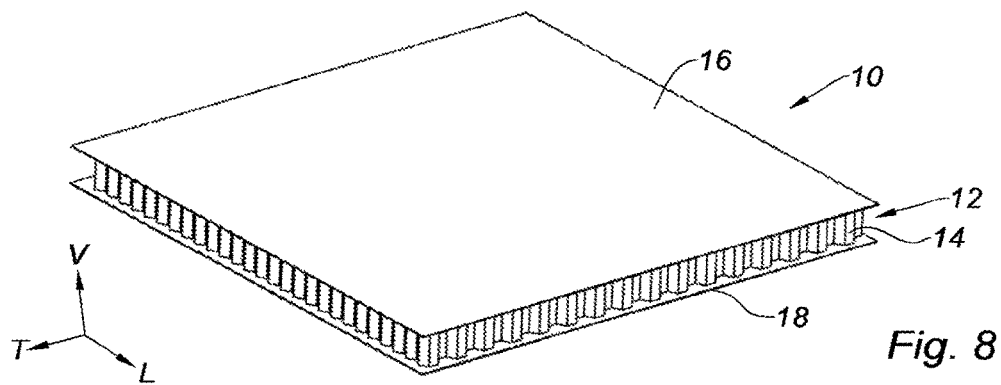
FIG. 8 is a perspective view that illustrates a composite panel manufactured according to a manufacturing method according to the present disclosure.

In the description and the claims, it should be understood that the terms "upper" and "lower" are used in a non-restrictive manner with reference to the upper portion and lower portion respectively of a panel illustrated in FIG. 8.

In addition, to clarify the description and the claims, the longitudinal, vertical and transverse terminology will be adopted in a non-restrictive manner with reference to the trihedron L, V, T indicated in the figures.

FIGS. 1 to 6 show the steps of a method for manufacturing a panel 10 made of ceramic-matrix composite-material, illustrated in FIG. 8, according to a first mode of implementation of the method.

As shown in FIG. 1, the panel 10 includes a core 12 formed of a plurality of cells 14 which are arranged in a honeycomb manner and which extend vertically between a first upper skin 16 and a second lower skin 18.

Figure 4:
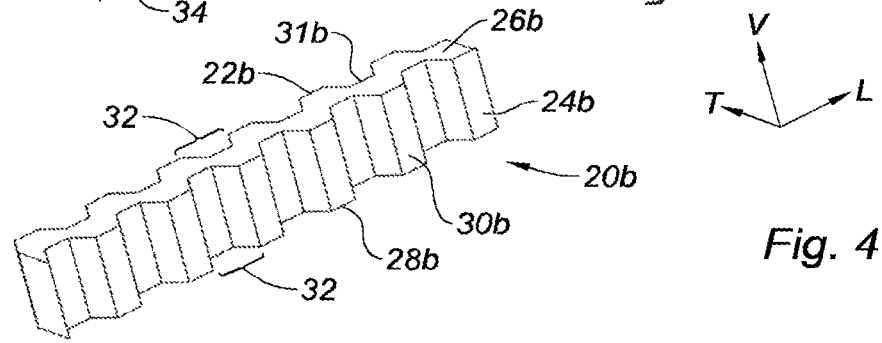
FIG. 4 is a perspective view that illustrates a second strip made of fugitive material having two cavities.

The method according to the present disclosure comprises a step of producing a plurality of strips including at least a first strip 20a shown as in FIG. 1, and a second strip 20b as shown in FIG. 4.

In order to facilitate the understanding of the description, the elements concerning the first strip 20a are indicated by a reference number followed by the letter "a" and the elements concerning the second strip 20b are indicated by a reference number followed by the letter "b".

Each strip 20a, 20b extends lengthwise along a longitudinal direction, each strip 20a, 20b being delimited transversely between a front face 22a, 22b respectively and a rear face 24a, 24b respectively, and each strip 20a, 20b being delimited vertically between an upper face 26a, 26b respectively and a lower face 28a, 28b respectively.

The front face 22a of the first strip 20a forms a first front cavity 30a.

Also, the front face 22b of the second strip 20b forms a first front cavity 30b and the rear face 24b of the second strip 20b forms a second rear cavity 31b which is offset transversely relative to the first cavity 30b by a distance equivalent to the width of a cell 14.

Note that, in this form, the first strip 20a includes only one cavity 30a because the first strip 20a is intended to form a peripheral edge of the cellular core 12.

Each cavity 30a, 30b, 31b has a slot-like shape which comprises a succession of half-cells 32 aligned longitudinally.

Each strip 20a, 20b is made of a fugitive material, that is to say a material which is adapted to disappear during the sintering phase at high temperature. According to one form, the fugitive material is a fungible material designed to liquefy by a certain temperature.

The strips 20a, 20b are for example shaped by a mechanical cutting, or by a laser or by a hot wire.

Figure 2:
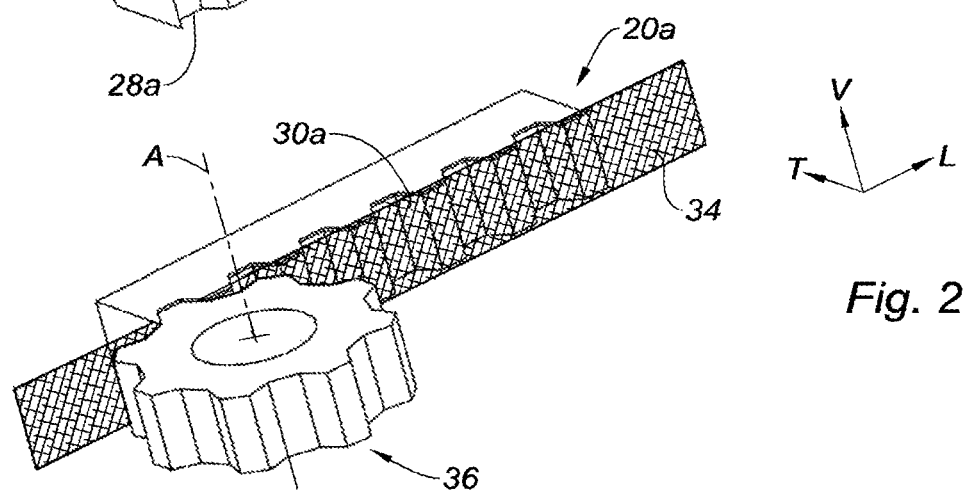
FIG. 2 is a perspective view that illustrates the first strip of FIG. 1 during a step of lining a fibrous ply on the cavity.

Following the step of producing the strips 20a, 20b, the method includes a lining step, illustrated in FIG. 2, which includes lining a fibrous ply 34, or several fibrous plies 34, on the first cavity 30a of the first strip 20a.

The fibrous ply 34 is composed of a fabric of ceramic fibers, such as alumina or alumino-silicate fibers for example.

As shown in FIG. 2, the fibrous ply 34 is lined on the first cavity 30a of the first strip 20a by a toothed wheel 36 which has a shape complementary to the shape of the first cavity 30a.

To this end, the toothed wheel 36 is driven in rotation about a vertical axis A, so that the toothed wheel 36 rolls and meshes with the first cavity 30a to press the fibrous ply 34.

According to one form, the fibrous ply 34 is pre-impregnated with slurry. The slurry may include a liquid and of alumina or alumino-silicate powder in suspension, which slurry is to produce the matrix.

However, in a non-restrictive manner, the fibrous ply 34 may be lined dry, in which case the fibrous ply 34 will be impregnated with slurry following the lining step, by sprinkling or dipping, for example.

Figure 3:
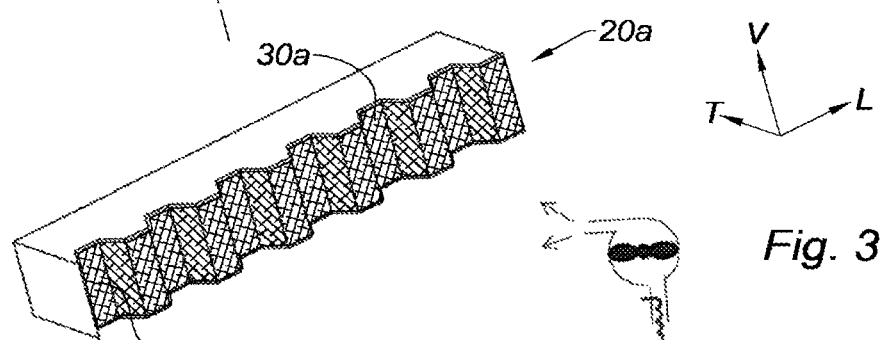
FIG. 3 is a perspective view that illustrates a step of drying a fibrous ply.

The lining step is followed by a drying step, illustrated in FIG. 3, which includes drying the fibrous ply 34 lined during the lining step.

Figure 5:
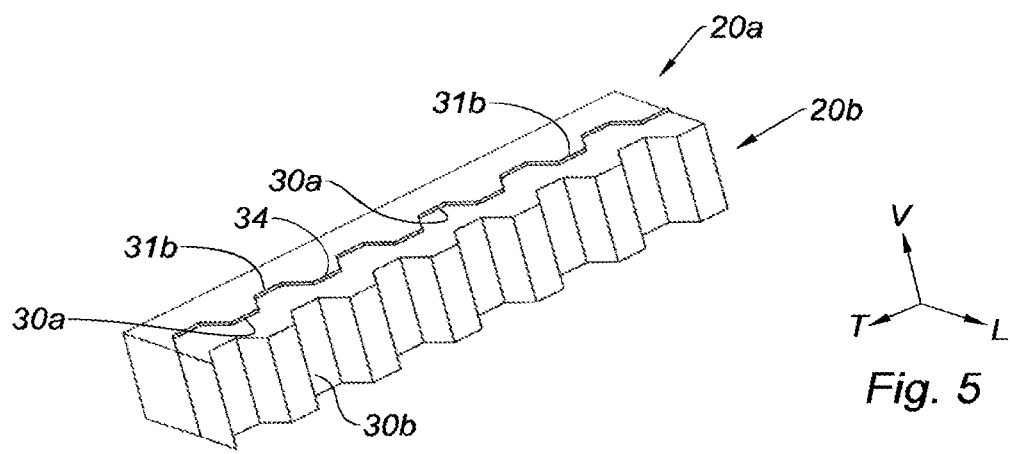
FIG. 5 is a perspective view that illustrates a step of assembling a first strip and a second strip.

Following the drying step, the method includes a step of assembling the first strip 20a and the second strip 20b, which includes interlocking the first cavity 30a of the first strip 20a with the second cavity 31b of the second strip 20b, by trapping the fibrous ply 34 between the first strip 20a and the second strip 20b, as shown in FIG. 5.

The assembling step is followed by a trimming step which includes removing the excess fugitive material from the set formed by the strips 20a, 20b during the previous assembling step, so as to form a third cavity 38 which forms a succession of half-cells 40.

Figure 6:
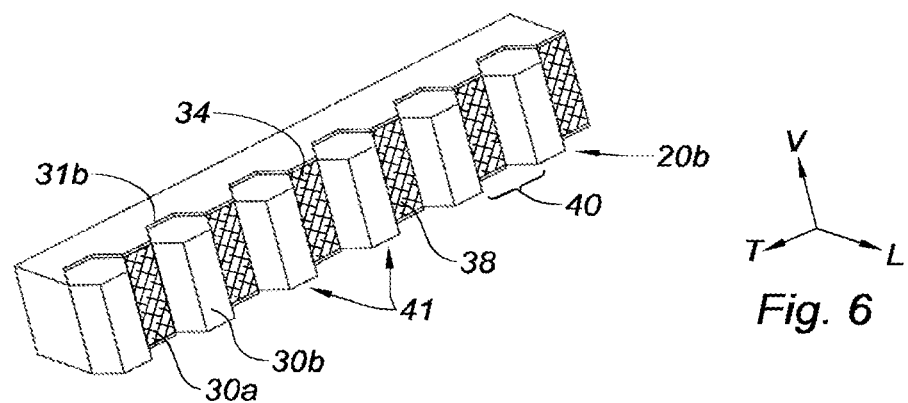
FIG. 6 is a perspective view that illustrates a step of trimming excess fugitive material to form a new cavity.

As shown in FIG. 6, at the end of the trimming step, the second strip 20a is reduced to a series of hexagonal columns 41, each column 41 forming a mold adapted to be lined with a fibrous ply to form a cell 14.

It will be also noted that the columns 41 are spaced apart longitudinally on a regular basis to allow an entanglement of the staggered cells 14, like a honeycomb.

The trimming step is for example carried out by a laser or by a hot wire.

Also, the trimming step is followed by a new lining step (not shown) which includes lining a fibrous ply on the third cavity 38 formed during the previous trimming step to form a series of cells 14, then a third strip is assembled on the third cavity 38, this third strip being in turn trimmed during a new trimming step.

Figure 7:
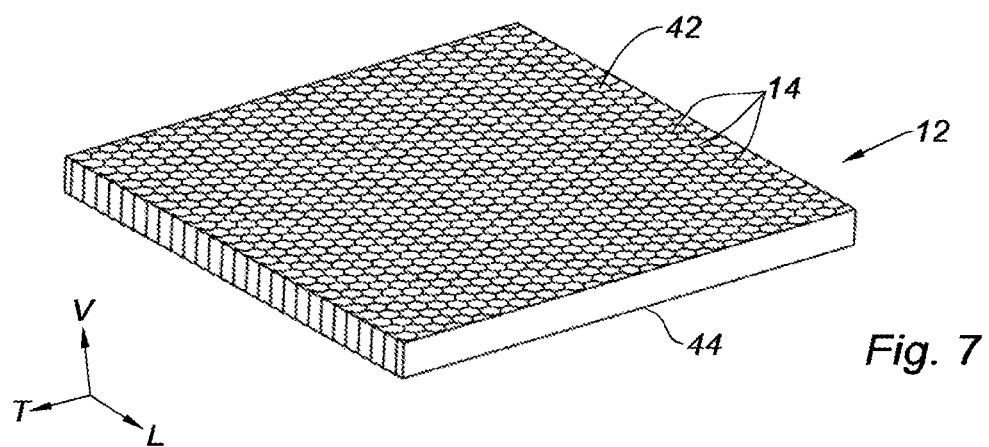
FIG. 7 is a perspective view that illustrates a cellular core of a composite panel.

The lining, assembling and trimming steps are repeated to form the cells 14 of the cellular core 12 of the panel 10, as many times to obtain the desired panel size. The cellular core 12 thus obtained is illustrated in FIG. 7.

Also, the method includes a closing step which includes draping the first skin 16 on a tooling, positioning a first face 42 of the cellular core 12 on the first skin 16, and draping the second skin 18 on a second face 44 of the cellular core 12. The two skins 16, 18 are both made from ceramic fibers impregnated with the slurry as for the production of the cellular structure.

At the end of the closing step, the first skin 16 and the second skin 18 are sintered on the cellular core 12 to assemble the cellular core 12 and the two skins 16, 18, in order to form the composite panel 10.

The previously described manufacturing method can be carried out in a substantially different manner according to a second mode of implementation described below.

According to the second mode of implementation, the method includes similar production, lining and drying steps as according to the first form, these steps leading to the first strip 20a lined by the fibrous ply 34, as illustrated in FIG. 3.

Figure 9:
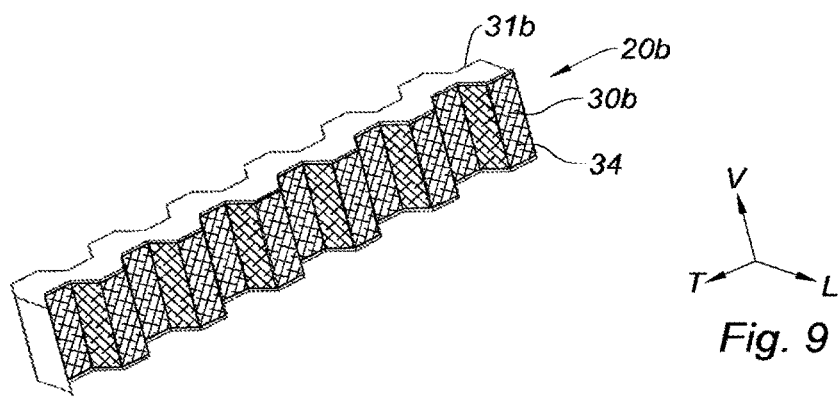
FIG. 9 is a perspective view that illustrates a second strip following a lining step according to a second mode of implementation of the present disclosure.

Unlike the first mode of implementation, the method according to the second form includes a new lining step which includes lining a fibrous ply 34, or several fibrous plies, on the first cavity 30b before the second strip 20b, as shown in FIG. 9.

The lining step is followed by a step of drying the previously lined fibrous ply 34.

Figure 10:
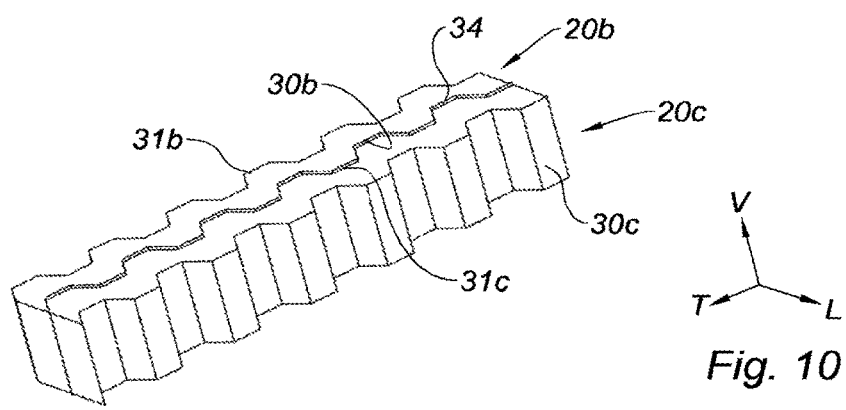
FIG. 10 is a perspective view that illustrates a step of assembling a second strip and a third strip according to a second mode of implementation of the present disclosure.

With reference to FIG. 10, following the drying step, the method according to the second mode of implementation includes a first step of assembling the second strip 20b and a third strip 20c, which includes interlocking the first front cavity 30b of the second strip 20b with a second rear cavity 31c of the third strip 20c, by trapping the fibrous ply 34 between the second strip 20b and the third strip 20c.

Still according to the second mode of implementation, the first assembling step is followed by a trimming step shown in FIG. 11, which includes removing the excess fugitive material from the set formed by the strips 20b, 20c during the first previous assembling step, so as to form a new cavity 46 which forms a succession of half-cells 48.

According to FIG. 12, the second assembling step is followed by a second assembling step which includes pivoting the set formed by the second strip 20a and the third strip 20c, and in assembling this set on the first strip 20a, as shown in FIG. 13.

The third assembling step is followed by a new trimming step illustrated in FIG. 14, which includes removing the excess fugitive material of the second strip 20b, so as to form a new cavity 50.

Thus, the fibrous plies 34 lined on the first strip 20a and on the second strip 20b are arranged opposite to each other and in a staggered manner to form a row of cells 14.

According to another aspect of the present disclosure, each cell 14 described subsequently has a hexagonal shape.

Figure 17:
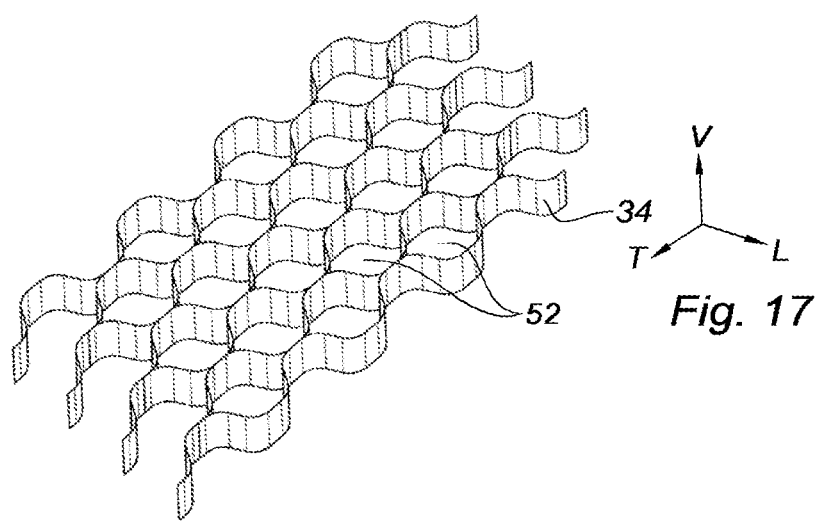
FIG. 17 is a perspective view that illustrates a variant of a cellular core having substantially cylindrical cells according to the present disclosure.

However, the manufacturing method according to the present disclosure allows production of other shapes of cells, for example cells 52 of a substantially circular section, as shown in FIG. 17.

To this end, the shape of the cavities formed by the fugitive material strips are adapted as well as the complementary shape of the toothed wheel 36.

The cells 52 of a substantially circular shape allow reducing the stresses in the fibrous plies during the draping operation and allow improving the flexibility in order to accommodate deformations when placing the cellular core 12 on the first skin 16.

In addition, the method according to the present disclosure allows producing a panel 10 in shape, that is to say a panel 10 which has a concave or a curved shape for example.

For this purpose, the upper face and the lower face of each strip 20a, 20b, 20c made of fugitive material has a curved shape, so that the produced panel 10 also has a curved shape.

According to an exemplary form not shown, the toothed wheel 36 is a heating wheel which is designed to heat the fibrous plies 34 pre-impregnated with slurry and to dry simultaneously the fibrous plies 34, during the draping step.

Figure 15:
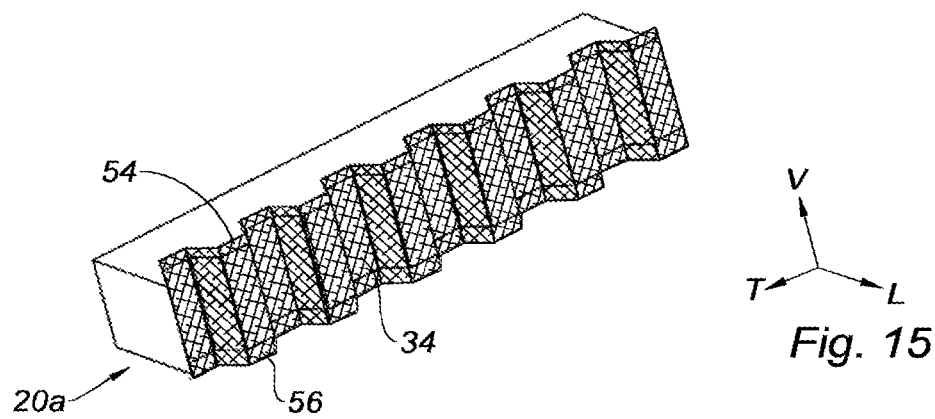
FIG. 15 is a perspective view that illustrates protrusions formed by a fibrous ply to form an adhesion flap on skins of a panel according to the present disclosure.

According to an exemplary form of the present disclosure shown in FIG. 15, the fibrous ply 34 which is lined on a strip 20a made of fugitive material has a first upper protrusion 54 and a second lower protrusion 56 which are folded on the upper face and on the lower face respectively of the associated strip.

The protrusions 54, 56 folded can increase significantly the overlength of the fibrous ply 34 relative to the fugitive material forming the strips, in order to allow an increase in the contact surface between the fibers of the fibrous ply 34 and the fibers of the skins 16, 18 of the panel 10.

In one form, the protrusions 54, 56 are not dried during the drying phase so that they keep the ability to deform.

Figure 16:
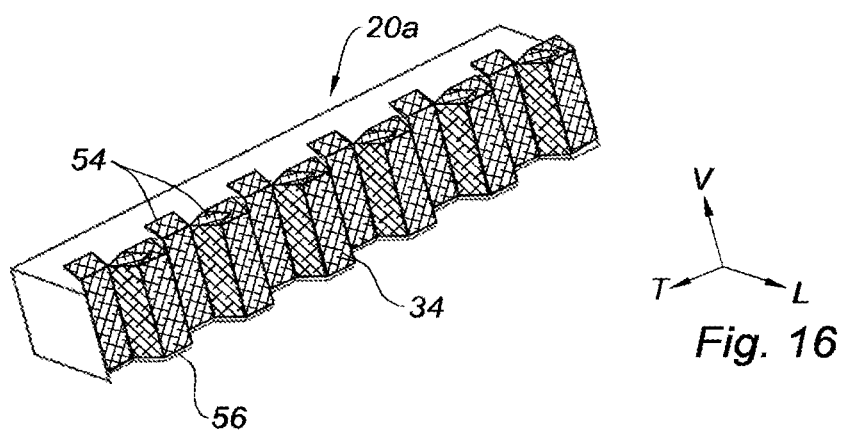
FIG. 16 is a perspective view that illustrates cutouts made on the protrusions of FIG. 15 formed by the fibrous ply.

Also, according to an exemplary complementary form shown in FIG. 16, the protrusions 54, 56 are cut along a cutting line at each nodal joint in order to allow the deformation of the fibrous ply 34 in order to fold down the protrusions 54, 56 on the fugitive material forming the associated strip.

The method according to the present disclosure is particularly suitable for manufacturing a composite-sandwich panel with a ceramic-matrix in particular an oxide-based one, the panel obtained by the method being adapted to equip a nacelle of an aircraft propulsion unit, in particular to form an acoustic panel resistant to heat.

The present description of the present disclosure is given by way of non-limiting example.

It will be understood that the steps of the method can be carried out in an order substantially different than in the order described in the present description.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a sandwich panel made of a ceramic-matrix composite-material, the sandwich panel including a core formed of a plurality of cells which extend vertically between a first skin and a second skin, the method comprising:
   producing at least a first strip and a second strip made of a fugitive material, each strip having at least one cavity comprising a succession of aligned half-cells;
   lining at least one fibrous ply on the at least one cavity of the first strip,
   assembling the first strip and the second strip by interlocking the at least one cavity of the first strip with the at least one cavity of the second strip by trapping said fibrous ply;
   trimming excess fugitive material of the first and second strips formed during the assembling step to form a new cavity which forms a succession of aligned half-cells; and
   repeating said producing, lining, assembling and trimming steps until the cellular core of the panel is formed.

2. The method for manufacturing a composite sandwich panel according to claim 1 further comprising a closing step including draping the first skin on a first face of the cellular core and draping the second skin on a second face of the cellular core that is formed during the production, lining, assembling and trimming steps.

3. The method for manufacturing a composite sandwich panel according to claim 2, wherein after the closing step, the first skin and the second skin are sintered on the cellular core to assemble the cellular core and said first skin and second skin to form the composite panel.

4. The method for manufacturing a composite sandwich panel according to claim 1, wherein each fibrous ply is made of ceramic fibers and is impregnated with slurry containing metal or mineral oxide powder to produce a ceramic matrix during a sintering operation.

5. The method for manufacturing a composite sandwich panel according to claim 4 further comprising drying the fibrous ply after each lining step.

6. The method for manufacturing a composite sandwich panel according to claim 1, wherein during the lining step, the at least one fibrous ply is lined on the at least one cavity of an associated strip by a toothed wheel, the toothed wheel defining a shape complementary to a shape of said at least one cavity.

7. The method for manufacturing a composite sandwich panel according to claim 6, wherein the toothed wheel is a heating wheel operable to heat and dry the at least one fibrous ply.

8. The method for manufacturing a composite sandwich panel according to claim 1, wherein each cell of the core of the sandwich panel defines a hexagonal shape.

9. The method for manufacturing a composite sandwich panel according to claim 1, wherein each cell of the core of the sandwich panel defines a circular shape.

10. The method for manufacturing a composite sandwich panel according to claim 1, wherein each strip made of fugitive material defines a curved shape such that the sandwich panel defines a curved shape.

11. The method for manufacturing a composite sandwich panel according to claim 1, wherein each fibrous ply comprises at least a first protrusion and a second protrusion folded on each side of an associated strip and adapted to cooperate with the first skin and second skin respectively.

12. The method for manufacturing a composite sandwich panel according to claim 1, wherein the sandwich panel is adapted to equip a nacelle of an aircraft propulsion unit.

* * * * *